3,226,454
POLYETHYLENE COMPOSITION CONTAINING CROSS-LINKED POLYETHYLENE GRAFT COPOLYMER AND PROCESS THEREFOR
Nelson S. Marans and Razmic S. Gregorian, Silver Spring, Md., assignors to W. R. Grace & Co., New York, N.Y., a corporation of Connecticut
No Drawing. Filed May 20, 1964, Ser. No. 369,003
4 Claims. (Cl. 260—878)

This application is a continuation-in-part of our copending application having Serial No. 90,637, filed February 21, 1961, now abandoned, which is in turn a continuation-in-part of our application having Serial No. 46,892, filed August 2, 1960, now abandoned.

This invention relates a method of preparing a polyethylene product. More particularly this invention is directed to producing a polyethylene composition of improved clarity and dye-ability without substantially affecting its flow properties.

Polymers of ethylene such as those described in Belgian 533,362 issued to K. Ziegler and in U.S. 2,816,883 issued to Larchar et al. are well known in the art today and are generally characterized by their organic solvent solubility and thermoplastic or flow properties. Polyethylenes produced in accordance with the aforesaid patent references are herein considered to be high density polyethylene, i.e., having a density in the range 0.94–0.97.

The advent of high density polyethylene introduced immediate problems in the commercial field. For instance, in comparison with conventional low density polyethylene (0.92) as described in U.S. 2,153,553 issued to E. Fawcett et al., high density polyethylene has an inferior clarity. Additionally, polyethylene in general, because of the non-polarity of the molecule has poor receptivity to dyes and printing inks.

Lately, several methods have been tried to increase the clarity of high density polyethylene to foster their commercial acceptability in fields, e.g., films, coatings, etc., wherein clarity is a requisite. The art has discovered that crosslinking of high density polyethylene improves the clarity thereof, and various methods have been employed in this direction. Such methods include crosslinking by irradiation and also by chemical reaction using, e.g., peroxides, diperoxides, hydroperoxides or azo-compounds as crosslinking agents, followed by subjecting the polymer to a curing step at elevated temperatures in order to obtain uniform crosslinking and improved clarity. However, it must be mentioned that the aforesaid crosslinking methods to improve clarity have the drawback that processing operations subsequent to crosslinking such as extrusion, molding, or the like to put the crosslinked polymer in the form of a shaped article to be passed on to the general public can only, if at all, be performed with the greatest difficulty. This is so because the substantially uniform crosslinking throughout the polymeric material greatly decreases the flow properties of the material to the point whereat the material is mainly thermoset instead of thermoplastic. Therefore, it is necessary in most cases to carry out all operations required to put the polymeric material in its final form, e.g., extrusion, molding, etc., before subjecting it to a crosslinking and a curing operation to obtain improved clarity. Such a procedure is unworkable in the commercial field since small retailers who are equipped to preform only the necessary extrusion, molding, and similar operations neither can afford nor possess the know-how to perform subsequent crosslinking operations by irradiation or otherwise. Additionally, the cost of returning the uncrosslinked shaped article to the polymer manufacturer for processing for improved clarity by crosslinking and curing would be prohibitive. Thus, a method to produce a polyethylene, and especially high density polyethylene and blends of high and low density polyethylene having improved clarity properties and which, because of their flow properties, can be subjected to subsequent shaping operations is a desideratum.

It has recently been discovered by one of us in U.S. 3,090,770, issued May 21, 1963, that blending a major portion of a parent polymer consisting essentially of polyethylene which has not been subjected to a crosslinking operation with a minor amount of a crosslinked polyethylene additive at a temperature above the melting point of the parent polymer will yield polyethylene having greatly improved clarity which can be subjected to subsequent processing and shaping operations. This aforesaid latter discovery, however, has the drawback in that the crosslinking operation requires high radiation dosages of the additive, e.g., 1–10 megarads in order to obtain the necessary degree of crosslinking to insure improved clarity in the parent polymer. Such high radiation dosages are costly and time-consuming. In addition, no improvement in receptivity to dyes or printing inks is obtained.

Surprisingly, it has now been discovered that blending a major portion of a parent polymer consisting essentially of polyethylene which has not been subjected to a crosslinking operation with an additive consisting essentially of polyethylene crosslinked with a polyvinylidene compound will yield polyethylene having greatly improved clarity and receptivity to dyes and printing inks and which can also be subjected to subsequent processing and shaping operations.

As the term "vinylidene" is used herein, it means a monomeric compound of the formula

wherein $R_1$ is hydrogen, an organic radical or a halogen, and $R_2$ is an organic or inorganic radical, said monomeric compound being of the type which polymerizes by a free radical mechanism in which polymerization terminates, at least in part, by radical coupling. Vinylidene monomers operable in the instant invention are well-known in the art and include but are not limited to, such material as unsaturated acids, acid halides, anhydrides and amides, unsaturated acid esters, vinyl esters, vinyl ethers, epoxyvinyls, vinyl ketones, vinyl nitriles, alkylvinyls, arylvinyls, alkylarylvinyls, sulfur-containing vinyls, phosphorous-containing vinyls, nitrogen-containing vinyls and the allylic analogues of the vinyl compounds. In addition, halogen-containing vinyl and allylic compounds may be used.

Among the suitable unsaturated acids that may be employed in the present invention are acrylic acid and methacrylic acid. Such acid halides as acrylyl chloride and methacrylyl chloride are useful. Also the acid anhydrides such as methacrylic anhydride and acrylic anhydride are suitable. Among the suitable amides are such as acrylamide, methacrylamide, N-methylolacrylamide, methylene bisacrylamide, N-methyl - N - vinylformamide, N-(beta-naphthyl)methacrylamide, N,N - diethylmethacrylamide, N-(p-chlorophenyl)acrylamide, N-(p-chlorophenyl)methacrylamide, and N,N-diallylmethacrylamide.

Among the suitable unsaturated acid esters are those of the acrylates such as methyl acrylate; ethyl acrylate; n-propyl acrylate; isopropyl acrylate; n-butyl acrylate; isobutyl acrylate; sec-butyl acrylate; tert-butyl acrylate; n-pentyl acrylate; n-hexyl acrylate; 2-ethylbutyl acrylate; 2-ethylhexyl acrylate; n-heptyl acrylate; n-octyl acrylate; 3,5,5-trimethylhexyl acrylate; octadecyl acrylate; cyclopentyl acrylate; cyclohexyl acrylate; n-decyl acrylate, tridecyl acrylate; 3,3,5-trimethylcyclohexyl acrylate; 2-n-butoxyethyl acrylate; 2-ethoxyethyl acrylate; 3-ethoxypropyl acrylate; 3-methoxyethyl acrylate; 2-methoxyethyl acrylate; benzyl acrylate; 2-phenoxyethyl acrylate; phenyl acrylate; 2-phenylethyl acrylate; 2-bromoethyl acrylate; 2-chloroethoxyethyl acrylate; 2-chloroethyl acrylate; 2,2,2-trifluoroethyl acrylate; N,N-diethylaminoethyl acrylate; 1,1 - dihydroheptafluorobutyl acrylate; N,N - dimethylaminoethyl acrylate; allyl acrylate; 2(N morpholino) ethyl acrylate; vinyl acrylate; ethylene diacrylate and tetrahydrofurfuryl acrylate.

Among other suitable unsaturated acid esters are those of the methacrylates. A representative list of methacrylates is as follows: ethyl methacrylate, methyl methacrylate, n-propyl methacrylate, butyl methacrylate; isobutyl methacrylate; n-amyl methacrylate; iso-amyl methacrylate; benzyl methacrylate; 2-bromoethyl methacrylate; 2-butoxyethyl methacrylate; sec-butyl methacrylate; isobutyl methacrylate; tert-butyl methacrylate; 2-chloroethyl methacrylate; N,N-dimethylaminoethyl methacrylate; 2-ethoxyethyl methacrylate; ethylene dimethacrylate; 2-ethylhexoxyethyl methacrylate; 2-ethylhexyl methacrylate; ethyl methacrylate; furfuryl methacrylate; n-heptyl methacrylate; n-hexyl methacrylate; lauryl methacrylate; 3-methoxybutyl methacrylate; 2-methoxyethyl methacrylate; octadecyl methacrylate; n-octyl methacrylate; 2-phenoxyethyl methacrylate; 2-phenylethyl methacrylate; isopropyl methacrylate; tetraethyleneglycol dimethacrylate; 3-3,5 - trimethylcyclohexyl methacrylate; 3,5,5 - trimethylhexyl methacrylate; cinnamyl methacrylate; cyclopentyl methacrylate; cyclohexyl methacrylate and n-decyl methacrylate.

Among the suitable vinyl esters are such as vinyl acetate; vinyl propionate; vinyl butyrate; vinyl n-decanoate; vinyl octanoate; vinyl salicylate; vinyl oleate; vinyl stearate and vinyl phenylacetate.

Among the suitable vinyl ethers are such as vinyl ethyl ether; vinyl propyl ether; vinyl isobutyl ether; vinyl n-butyl ether; vinyl 2-ethylhexyl ether; vinyl 2 chloroethyl ether and vinyl 2-methoxyethyl ether.

Among the suitable epoxy vinyls are such as butadiene oxide; 1,2-diisobutylene oxide; glycidyl methacrylate.

Among the suitable ketones are methyl vinyl ketone and ethyl vinyl ketone.

Among the suitable nitriles are acrylonitrile and methacrylonitrile. Among the suitable alkylvinyls are such as butadiene and isoprene. Among the suitable arylvinyls are such as styrene; vinylnaphthalene; p-chlorostyrene; m-chlorostyrene; o-chlorostyrene; 2,5-dichlorostyrene; and p-bromostyrene. Among suitable alkylarylvinyls are such as alpha-methylstyrene; and ortho, meta and para substituted alkyl styrenes. Among suitable sulfur-containing vinyls are the vinylsulfonates; vinyl sulfides; vinyl sulfones; vinyl thiocarboxylates; and vinyl thioethers. Among suitable phosphorus compounds are such as the vinyldialkyl phosphine oxides; the vinyl- alkylaryl phosphine oxides; the vinyldiaryl phosphine oxides and the corresponding phosphines.

Among the suitable nitrogen-containing vinyl compounds are such as the vinylpyridines; vinylpyrrolidones; vinylisocyanates; nitroolefins and vinylamines and their salts. Among the allylic analogues to the vinyl compounds are such materials as allylacetic acid; allylidene diacetate; allyl acetate; N-allyl acrylamide; allyl beta-allyloxypropionate; allylamine; N-allyl aniline; allyl anthranilate; allylbenzene; allyl benzoate; allyl bromide; allyl n-butyrate; allyl carbamate; allyl choride; allyl chloroacetate; allyl cinnamate; allyl crotonate; allyl cyanide; allyl ether; allyl 2-ethylbutyrate; allyl ethyl ether; allyl glycol ether; allyl n-heptanoate; allyl hexoate; allyl n-hexyl ether; allyl isocyanate; allyl laurate; allyl methacrylamide; allyl methacrylate; allyl myristate; allyl octanoate; allyl palmitate; allyl pelargonate; allyl phenoxyacetate; allyl phenylacetate; allyl phenyl ether; allyl propionate; allyl stearate; allyl trifluoroacetate; allylurea; allyl n-valerate; allyl isovalerate; diallyl adipate; diallyl amine; diallyl diglycolate; diallyl malonate; N,N-diallyl methacrylamide; and diallyl phthalate.

Among the halogenated unsaturated compounds suitable in this application are vinyl chloride, vinylidene chloride, vinyl bromide, vinyl fluoride, vinyl iodide, and vinylidene fluoride.

The crux of the invention lies in the fact that irradiation of the polyethylene at low dosages followed by grafting thereto at the active free radical sites in the polyethylene which results in crosslinks will yield an additive which on blending with a parent polyethylene greatly improves the clarity and dyeability thereof. It has been found that irradiation at the low dosages of the instant invention without subsequent crosslinking through a grafted polyvinylidene compound will not give the high increase in clarity or dyeability of the parent polymer. This is due to the fact that irradiation at the low dosage of this invention without subsequent crosslinking through the polyvinylidene will yield a polymeric additive which is less crosslinked than if irradiation is followed by crosslinking through the polyvinylidene compound.

The reason for the increase in clarity of the parent polymer is not known at this time. It is known that in a parent polyethylene and especially high density polyethylene, on cooling below its melting point, the crystallites form spherulites. Large spherulites refract light thereby making the polymer translucent or opaque. On this basis it was theorized that if a cross linked additive which has a higher flow point than the parent polymer is uniformly admixed as minute particles with the parent polymer at temperatures above the flow point of the parent polymer but not necessarily above the flow point of the additive, such minute particles would, on cooling, act as nucleation sites for the crystallite growth of the parent polymer. Because of the multitude of minute particles, crystallite growth would initiate at an infinite number of sites thereby resulting in many smaller spherulites instead of larger spherulites. Since the smaller spherulites do not refract light, transparency of the parent polymer is obtained.

Another possible and somewhat similar explanation for the improved clarity would be as follows. The grafted or crosslinked material in the system, though fluid above the melting point of the parent polymer, crystallizes faster than the parent polymer and thus nucleates crystallization of the parent polymer in such a fashion as to prevent large spherulite formation. A third explanation would consist of interference with the growth of large spherulites by breaking of the pattern of crystallite agglomeration to spherulites by introduction of the crosslinked thermoset material. However, applicants do not wish to be bound by any theory. Suffice it to say that the admixture of an additive consisting essentially of polyethylene crosslinked and having a polyvinylidene compound grafted thereonto with a major portion of a parent polymer consisting essentially of uncrosslinked polyethylene greatly improves the clarity and receptivity to dyes and printing inks of the admixed processable polymeric composition.

Although in the instant invention the greatest increase in clarity is obtained when the polyethylene in the additive is high density polyethylene, the invention will also produce improved clarity when the polyethylene in the additive is low or medium density ethylene polymer, i.e., 0.91 to 0.94, blended with a parent polyethylene in a broad density range. Thus, it is possible by means of this invention to improve the clarity of a parent polyethylene having a density in the range 0.91 to 0.97 by blending therewith an additive of polyethylene having a density range of 0.91 to 0.97 crosslinked with a polyvinylidene compound grafted thereto. Additionally, it is possible to blend an additive comprising a mixture of polyethylene consisting of polyethylene of various densities crosslinked with and having a polyvinylidene compound grafted thereonto with a mixture of parent polyethylene having varying densities to improve the clarity and receptivity to dyes and printing inks. The polyethylene in the additive is crosslinked to a pregelation stage through coupling of a portion of the free radicals formed during irradiation and crosslinked to gelation by the polyvinylidene compound. Thus the resulting additive is a crosslinked, thermoset material, containing a three dimensional network structure.

The amount of additive consisting essentially of polyethylene crosslinked with a polyvinylidene compound grafted thereonto to be blended with the parent polymer in accordance with the instant invention is nominal in comparison to the increased clarity afforded thereby. Amounts of additive equal to about 0.1 to 20% by weight of the parent polymer are operable. Even greater amounts are workable but are unnecessary. A preferred amount of additive is in the range 0.5 to 5% by weight of the parent polymer.

In the preferred procedure of the instant invention the amount of monomeric vinylidene compound grafted onto the polyethylene in the additive is dependent upon various factors, one of which is the number of trapped free radicals in the irradiated polymer. Since the polymerization of the vinylidene compound is terminated biradically, the percent of vinylidene compound grafted is approximately proportional to the irradiation dosage to the one-half power. Thus the percent of grafted vinylidene compound in the additive is about 1 to 95% by weight of the final additive under ordinary operating conditions in the instant invention.

The irradiation of the polyethylene in the additive accomplished two objectives. It not only crosslinks the polymer to a pregelation value but also causes the formation of trapped free radicals in the polymer. These trapped free radicals act as initiating sites for polymerization of the monomeric vinylidene compound introduced into the additive. Thus the monomeric vinylidene compound is polymerized by free radical initiation and grafted onto the polyethylene at the sites of the trapped free radical. The grafted polyvinylidene then forms crosslinks by radical coupling.

The irradiation of the polyethylene in the additive to be blended with the parent polymer can be carried out by various methods. A preferred feature of the irradiation operation of the instant invention is treatment with high energy particle or corpuscular irradiation. Although the examples, herein, used high energy irradiation, i.e., from a Van de Graaff electron accelerator, it should be understood that the present invention is not limited thereto. Irradiation employing particles in the instant invention includes the use of positive ions (e.g., protons, alpha particles and deuterons), electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a G.E. resonant transformer, a synchrotron or the like. Furthermore, particle irradition may also be supplied from radioactive isotopes or an atomic pile. The amount of high energy radiation which is employed in irradiating the polyethylene additive in the instant invention can vary between broad limits. Preferably, however, low radiation dosages, i.e., less than a megarad are employed. A preferred radiation dose is in the range 0.01 to 2.0 megarads. The actual dosage within the aforestated range is a function of the molecular weight of the polyethylene in the additive, with the dosage increasing as the molecular weight of the polyethylene decreases. Such low radiation dosages decrease the cost of the radiation step. Low energy radiation dosages decrease the cost of the radiation step. Low energy irradiation such as ultra violet light may also be used. UV irradiation at a wave length of about 254 millimicrons necessitates the incorporation of a UV sensitizer, e.g., benzophenone into the polyethylene prior to irradition.

The irradiation and grafting steps are performed in an inert atmosphere or in vacuum. This is to insure the exclusion of oxygen and other materials which deactivate the free radicals. When the aforesaid steps are performed in air, higher irradiation dosages and longer grafting periods are necessary to attain comparable results acquired in an inert atmosphere. In addition, large amounts of homopolymer of the vinylidene compound are formed. In most examples herein, pure lampgrade nitrogen was used as the inert atmosphere. However, the noble gases, especially argon, are equally suitable.

The grafting reaction is performed at temperatures whereat thermal induced homopolymerization of the monomeric vinylidene compound is reduced. This is to insure that the polymerization of the vinylidene compound will be initiated at the trapped free radical sites in the polyethylene thus grafting the monomer thereto. If temperatures are too high, thermal induced polymerization commences initiating free radical formation in the monomer itself. This results in formation of a homopolymer of the monomeric vinylidene compound, not a graft polymer. It has been found that the grafting operation is generally best performed at temperatures in the range 20 to 100° C. whereat the polyethylene is sufficiently swelled by the monomeric vinylidene compound to allow the monomeric vinylidene compound to reach the trapped free radicals therein without causing thermal induced polymerization to any appreciable extent. The exact temperature used is a function of both the polymer to be grafted and the monomer employed. However, temperatures below the melting point of the polymer in the additive must be used if the particle size of the polymer is to be maintained.

The polyethylene to be irradiated can be in various forms. A particulate form of small mesh size, e.g., 5 to 500 mesh or less is operable. (This mesh size being equivalent to 4.0 mm. diameter or less.) Preferably polyethylene particles in the mesh size range of 20 to 400 mesh are employed. However, the polyethylene in the form of crumb, sheeting, film and the like when subjected to irradiation or other radical-forming means is still operable within the teaching of this invention. It is preferred, however, after grafting the vinylidene material to the polyethylene, to blend the thus formed additive in finely divided form into the parent polymer. Therefore, such polyethylene forms as crumb, etc., after grafting and crosslinking are preferably reduced to particulate form to insure uniform blending with the parent polymer.

The additive is prepared by causing trapped free radical formation and crosslinking in a minor amount of polyethylene, preferably high density polyethylene, either by subjecting it to irradiation or chemical means using free radical producing agents, and thereafter contacting the polyethylene containing trapped free radicals with the vinylidene compound to be grafted thereto for sufficient time to cause grafting at the trapped free radical sites. The additive is then ground to a small mesh size, e.g., 5–500 mesh, i.e., 4.0 mm. diameter or less, for blending with the parent polymer.

The blending of the additive with the parent polymer is performed at or above the melting point of the parent polymer. Temperatures ranging from the melting point of the parent polymer up to 200° C. or more are operable. A preferred temperature range for high density polyethylene is 150–175° C.

In all examples herein, unless otherwise noted, a Brabender Plastograph was used to blend the crosslinked polyethylene additive with the parent polymer above its melting point. However, other mechanisms, e.g., a Banbury mixer are equally operable. It is also possible to feed the crosslinked polyethylene additive and the parent polyethylene polymer in particulate form at preset rates into the hopper of an extruder or molding machine and accomplish the blending in the heated barrel thereof immediately preceding the shaping operation.

The flow properties of the polyethylene product produced by the instant invention are described as a function of the melt index. A polyethylene product which evidences a high melt index has a low melt viscosity and therefore, better flow properties. Throughout the invention the melt indices (MI) were measured under the conditions specified in ASTMD 1238-52T. The melt index of the parent polyethylene is not critical and can be varied over a broad range within which the material is workable in processing or shaping operations. Nor is the initial melt index of the polyethylene in the additive prior to irradiation critical, except that the higher the melt index the higher the irradiation dosage necessary within the aforementioned range.

The clarity test devised specifically for evaluation of changes in the clarity of polyethylene consists of viewing, through a ½" diameter hole centered in a horizontal sample table holding clarity test samples thereon, a glowing filament from a 2-watt concentrated arc lamp (Sylvania C2/D.C. point light source), the extreme tip of said filament being situated 3 inches below the bottom surface of said test sample. The clarity test samples are prepared by molding under 10,000 lbs. pressure at 350° F. and then air cooling to room temperature for unquenched samples or immersing in a $H_2O$ bath at room temperature for quenched samples. The results of the clarity test are expressed in terms of the clarity number (mils) which is defined as the maximum thickness of the sample in mils through which the glowing filament, as viewed from 1 foot above the sample table, can still be observed.

The subjective dyeability test rated the intensity of the pink color in the film. The darkest shade exhibiting the greatest dye receptivity and thus obtaining the highest rating, i.e., good.

The following examples will aid in explaining the instant invention but are not to be deemed as limiting its scope.

In the examples, all parts and percentages are by weight.

Example 1

Crude polyethylene having a melt index of 0.52 and a density of 0.960 was pressed into three sheets (30–45 mils thick) cut into 40 to 50 pieces, and irradiated in nitrogen to a dosage of 0.5 megarad, with a Van de Graaff electron accelerator. This dosage consisted of a single pass under the Van de Graaff electron accelerator at a beam current of 95 microamperes and a voltage of 2 million volts. The irradiated pieces (50 grams total) were added to 300 grams of vinyl acetate in a 1-liter 3-necked flask and the mixture heated at the reflux temperature of vinyl acetate (78° C.) for 2 hours in a nitrogen atmosphere (0.5 l./min. passage rate). The pieces were removed and subjected to washing in benzene followed by an acetone wash. The dried grafted product weighed 57.2 grams indicating a 14.4% graft of vinyl acetate on the crosslinked polyethylene. The grafted product did not melt below 150° C. The pieces were then ground in a Wiley mill to pass a 20 mesh screen, i.e., less than 0.84 mm. diameter, for use as an additive in examples hereinafter.

Example 2

Varying percents of the vinyl acetate grafted polymer additive prepared in Example 1 was admixed with crude polyethylene (40 mesh crumb) having a melt index of 5.0 and a density of 0.96. The admixtures were charged to a Brabender Plastograph and milled for about 5 minutes at a temperature of about 160° C. Table I shows the improvement in clarity obtained with this additive.

TABLE I

| Percent Additive | Product Melt Index | Product Clarity No. (mils) Unquenched |
|---|---|---|
| 0 a | 5.0 | 4–5 |
| 2.0 | 4.2 | 30–39 |
| 1.0 | 4.74 | 36–44 |
| 0.5 | 3.32 | 30–36 | a Control run crude polyethylene (5.0 melt index, 0.96 density) without additive, milled on Brabender Plastograph for 5 mins. at about 160° C.

As can be seen from Table I, a greater than 600% increase in clarity is obtained over a sample milled without an additive.

Example 3

Commercial polyethylene, 200 mesh, having a density of 0.96 and a melt index of 6.5 was irradiated in vacuum (<0.5 mm. Hg) to a dosage of 1 megarad. Irradiated polymer was then grafted with 2 cc. of various monomers for two hours at 80° C. in sealed evacuated tubes. Purification and monomer removal were accomplished by addition to acetone followed by filtration and a subsequent acetone washing. The melting characteristics of these various grafted additive materials were examined and the data is reported in Table II.

TABLE II

| Monomer grafted: | Percent melt at 150° C. |
|---|---|
| None | 100 |
| Acrylonitrile | 0 |
| Methyl acrylate | 50 |
| Vinyl acetate | 90 |
| N-vinyl-2-pyrrolidone | 0 |
| 2-vinyl pyridine | 10 |
| Ethyl methacrylate | 40 |

The above formed grafted material is used as additives in the following example.

Example 4

The grafted materials prepared in Example 3 were admixed with 1.0 melt index commercial polyethylene having a density of 0.960. The admixture was charged to a Brabender Plastograph and milled for about 5 minutes at a temperature of 160° C. Samples of the products were prepared for clarity tests by compression molding the samples into thin sheets (5–10 mils thick) on a Carver press at 10,000 lbs. pressure at a temperature of 350° F., and thereafter cooling a portion of the samples in air to room temperature for unquenched clarity test samples and quenching the remainder of the samples in $H_2O$ at room temperature for quenched clarity test samples. The results of the clarity test mentioned supra are reported in Table III.

TABLE III

| Monomer Grafted in Additive | Parts of Additive per 100 parts parent polymer | Product Characterization | | |
|---|---|---|---|---|
| | | MI | Clarity Quenched | Number (mils) Air Cooled |
| None [a] | | 0.90 | 21– 28 | 7–14 |
| 2-vinylpyridine | 1 | 0.80 | 56– 63 | 23–29 |
| Acrylonitrile | 2.74 | 0.76 | 27– 33 | 6–11 |
| Ethyl methacrylate | 2.74 | 0.80 | 33– 40 | 13–21 |
| Methyl acrylate | 2.74 | 0.80 | 82– 87 | 38–44 |
| Vinyl acetate | 1 | 0.85 | 141–147 | 39–68 |
| N-vinyl-2-pyrrolidone | 1 | 0.80 | 27– 37 | 9–15 |

[a] Control run–commercial polyethylene (1.0 melt index, 0.960 density) without additive, milled on Brabender Plastograph for 5 minutes at 160° C.

*Example 5*

The following runs in Table IV were carried out to show the improvement in clarity obtained by using an additive of the instant invention as contrasted with an additive consisting of irradiated polyethylene per se. The results in Table IV show the necessity of using high radiation dosages on an additive of polyethylene per se to obtain clarity of the same order of magnitude as that obtained by an irradiated grafted additive, e.g., polyethylene vinyl acetate graft copolymer. Compare Runs Nos. 1 and 5 in Table IV. Additionally, it should be noted that the weight percent of additive must necessarily be greatly increased in the case of the polyethylene additive (Run 5) to obtain the clarity in Run 1 in Table IV.

TABLE IV

| Run No. | Additive Composition | Wgt. Percent of Additive in Blend | Irradiation Dosage [d] (Megarads) | Melt Index [e] Blended Product | Clarity Number (mils) [f] | |
|---|---|---|---|---|---|---|
| | | | | | Quenched | Unquenched |
| 1 | Vinyl acetate grafted to polyethylene [a] | 1.0 | 1.0 | 0.85 | 141–147 | 39–68 |
| 2 | Polyethylene [b] | 0.5 | 1.0 | 0.92 | 34– 43 | 21–29 |
| 3 | Polyethylene [b] | 5.0 | 1.0 | 0.72 | 77– 82 | 50–55 |
| 4 | Polyethylene [b] | 0.5 | 10.0 | 0.85 | 81– 88 | 48–55 |
| 5 | Polyethylene [b] | 5.0 | 10.0 | 0.64 | 159–167 | 67–75 |
| 6 | None [c] | 0 | 0 | 0.80 | 18 | 13 |

[a] Irradiated polyethylene (melt index 6.5, density 0.96) grafted with vinyl acetate for 2 hours at 80°C then blended in Brabender Plastograph at 160°C for 5 minutes with commercial polyethylene (melt index 1.0, density 0.96).
[b] Irradiated polyethylene (melt index 5.0, density 0.96) blended in Brabender Plastograph at 160°C for 5 minutes with commercial polyethylene (melt index 1.0, density 0.96).
[c] Control run—commercial polyethylene (melt index 0.7, density 0.96) blended in Brabender Plastograph for 5 minutes at 160°C.
[d] Van de Graaff electron accelerator used as irradiation source.
[e] Obtained by melt index procedure specified in ASTMD 1238-52T.
[f] Obtained by clarity method described supra.

*Example 6*

Commercial polyethylene (200 mesh) having a density of 0.96 and a melt index of 6.5 was irradiated in vacuum (0.5 mm. Hg) within a dosage range of 0.5–1.0 megarad. The irradiated polymer was then grafted with 2 cc. of various monomers for 2 hours at 80° C. in sealed evacuated tubes. Purification and monomer removal were accomplished by addition to acetone followed by filtration and a subsequent acetone wash. The percent graft of the various additive materials were analyzed and the results are reported in Table V.

TABLE V

| Composition | Monomer Grafted | Percent Monomer in Grafted Additive Materials | Dosage (Megarads) |
|---|---|---|---|
| A | Ethyl acrylate | 28.1 | 1.0 |
| B | 2-vinyl pyridine | 30.4 | 0.5 |
| C | Vinyl acetate | 32.8 | 1.0 |
| D | Methyl acrylate | 46.3 | 1.0 |
| E | Acrylonitrile | 32.2 | 0.5 |

The thus-grafted additive materials in an amount equal to 4.0 weight percent of the total admixture were mixed with commercial polyethylene having a melt index of 0.7 and a density of 0.96. The admixtures were charged to a Brabender Plastograph and milled for about 5 minutes at a temperature of 160° C. Samples of the admixed products were characterized for tensile properties. The tensile properties were measured at 23° C. on an Instron Tensile Tester equipped with Instron jaws using a straight strip sample (2″ gauge length by ¼″ width). Elongation was measured by crosshead displacement. The results of tensile tests are shown in Table VI.

The results in Table VI clearly show the improvement obtained in the tensile properties of the grafting material of the instant invention over polyethylene per se.

TABLE VI

| Composition [1] | Density g./cc. | Tensile Strength $\times 10^{-3}$ (p.s.i.) | Tensile Modulus $\times 10^{-3}$ (p.s.i.) | Stress at Yield $\times 10^{-3}$ (p.s.i.) | Percent Elongation at Yield | Percent Elongation at Failure |
|---|---|---|---|---|---|---|
| A-1 | 0.961 | 2.7–3.3 | 203–233 | 4.2–4.3 | 9.1–9.7 | 350 |
| B-1 | 0.952 | 2.7–3.2 | 166–300 | 4.2–4.3 | 9.7–9.9 | 550 |
| C-1 | 0.960 | 4.7–6.1 | 348–486 | 7.2–8.0 | 8.9–10.3 | 355 |
| D-1 | 0.963 | 2.8–3.4 | 204–260 | 4.1–4.2 | 9.2–10.2 | 90 |
| E-1 | 0.960 | 2.6–3.4 | 197–231 | 4.1–4.2 | 9.8–10.0 | 300 |
| F [2] | 0.953 | 2.5–2.6 | 173–193 | 3.8–3.9 | 9.3–10.5 | 100 |

[1] 4% by weight of corresponding lettered additives listed in Table V, 96% by weight of commercial polyethylene (0.7 melt index; 0.96 density).
[2] Control run—100% by weight commercial polyethylene (0.7 melt index; 0.96 density) milled in a Brabender Plastrograph for 5 minutes at 160° C.

Example 7

Commercial polyethylene (200 mesh) having a density of 0.96 and a melt index of 6.5 was irradiated in vacuum (0.5 mm. Hg) at various dosages. The irradiated polymer was then grafted with 2 cc. of various monomers for 2 hours at 80° C. in sealed evacuated tubes. Purification and monomer removal were accomplished by addition to acetone followed by filtration and a subsequent acetone wash. The thus-grafted additive materials were then admixed in an amount equal to 2.0 weight percent of the total admixture with 0.7 melt index commercial polyethylene having a density of 0.96. The admixture was charged to a Brabender Plastograph and milled for about 5 minutes at a temperature of 160° C. Samples of the products were prepared for clarity tests by compression molding the samples into thin sheets (5–10 mils thick) on a Carver Press at 10,000 lbs. pressure at a temperature of 350° F., and thereafter cooling a portion of the samples in air to room temperature for unquenched clarity tests samples and quenching the remainder of the samples in $H_2O$ at room temperature for quenched clarity test samples. The results of the effect of radiation dosage on clarity are reported in Table VII.

TABLE VII

| Monomer Grafted in Additive | Dosage [b] (megarads) | Clarity No. (mils) [c] | |
|---|---|---|---|
| | | Quenched | Air Cooled |
| None [a] | 0 | 18 | 13 |
| Acrylonitrile | 0.1 | 79–84 | 41–46 |
| | 0.2 | 93–97 | 44–47 |
| | 0.5 | 30–34 | 17–21 |
| | 2.0 | 50–55 | 27–32 |
| | 5.0 | 21–25 | 12–16 |
| 2-vinyl pyridine | 0.1 | 44–48 | 19–24 |
| | 0.2 | 44–49 | 22–26 |
| | 0.5 | 39–43 | 19–23 |
| | 2.0 | 40–44 | 21–25 |
| | 5.0 | 21–26 | 10–15 |
| N-vinyl-2-pyrrolidone | 0.1 | 51–56 | 18–21 |
| | 0.2 | 28–33 | 11–15 |
| | 0.5 | 87–89 | 45–49 |
| | 2.0 | 55–59 | 29–32 |
| | 5.0 | 50–55 | 20–23 |
| Vinyl acetate | 0.1 | 34–37 | 14–18 |
| | 0.2 | 52–57 | 17–20 |
| | 0.5 | 72–76 | 28–31 |
| | 2.0 | 58–62 | 37–40 |
| | 5.0 | 62–67 | 37–40 |
| Methyl acrylate | 0.1 | 33–36 | 14–17 |
| | 0.2 | 29–33 | 12–15 |
| | 0.5 | 55–58 | 23–26 |
| Styrene | 0.1 | 32–36 | 16–19 |
| | 0.2 | 40–44 | 21–25 |
| | 0.5 | 26–30 | 13–18 |

[a] Control run—commercial polyethylene having a melt index of 0.7 and a density of 0.96 milled on a Brabender Plastograph at 160° C. for 5 minutes.
[b] Van de Graaff electron accelerator used as irradiation source.
[b] Obtained by clarity method described supra.

As can be seen from the results in Table VII the improvement in clarity varies with the amount of irradiation dosage imparted to the polymer in the additive. However, it should be noted that optimum clarity is not obtained in all cases with any specific irradiation dosage. For example, optimum clarity is obtained when the grafted monomer is acrylonitrile at a dosage of 0.2 megarad whereas optimum clarity is obtained when the grafted monomer is N-vinyl-2-pyrrolidone at a dosage of 0.5 megarad. Thus, it should be understood that different monomers grafted in the additive give clarity peaks at different irradiation dosages.

Example 8

Commercially available polyethylene (<200 mesh), having a density of 0.96 and melt index of 6.5, was used in the additive for these grafting experiments. For each monomer grafting set, 2 g. of the polymer was loaded into each of three 10 mm. O.D. glass tubes. The tubes were then sealed at a pressure of less than 0.5 mm. of mercury and irradiated to the described dose. After irradiation, the sealed tubes were opened and 4.0 g. of monomer added to each tube. The tubes were then resealed at —80° C. and at a pressure of less than 0.5 mm. of mercury. The tubes and contents were heated at 80° C. for two hours. The contents of the tubes were then washed with acetone and allowed to dry.

After drying, samples of the grafted polymer were submitted for oxygen or nitrogen analyses and the percentage monomer in the grafted polymer determined from the elemental analysis. The thermoset characteristics of the graft polymer were determined on a Fisher-Johns melting point block and all of the grafts were shown to be thermoset at 155° C.

The graft polymer was then charged to a Brabender Plastograph at 170° C. using 4 parts of the additive to 96 parts of commercially available polyethylene, density 0.96 and melt index 0.7 and milled for about 30 minutes under nitrogen. The resultant polymeric blend was then pressed at 180° C. and 6,000 p.s.i. into 20 mil films and dyeability tests performed on these films. The dyeability test consisted of treating the film at 70° C. for thirty minutes with a 1% solution in distilled water of Celliton Fast Pink, BA1–25620. The unattached dye was removed by permitting the treated film to go through two distilled water washes of fifteen minutes each.

The compositions of the instant invention may also contain conventional polyethylene compounding agents such as antioxidants, and anti-static and slip agents.

The polyethylene product produced by the instant invention can be used in many applications, especially those wherein clarity coupled with dyeability is required in the processed article. Such uses include film and ribbon for packaging, yarn, filament, sheeting, coating, extruded articles and the like.

As aforementioned, the vinylidene monomers which are operable in the instant invention are those which polymerize by a free radical mechanism in which polymerization terminates, at least in part, by radical coupling. Such monomers are well known to those skilled in the art, see for example, High Polymers, vol. VIII, chap. 1, Alfrey, Bohrer and Mark, Interscience Publishers, New York, 1952; An Introduction to the Organic Chemistry of High Polymers, C. S. Marvel, pp. 34–37 and 61–64, John Wiley & Sons, New York, 1959; Vinyl and Related Polymers, C. E. Schildknecht, pp. 26–27, John Wiley & Sons, New York, 1952; High Polymers, vol. III, G. M. Burnett, pp.

The data are summarized in Table VIII.

TABLE VIII

| Monomer Grafted in Additive | Dosage [b] (megarads) | Additive Thermoset | Monomer in Graft | Dyeability Rating [c] |
|---|---|---|---|---|
| Vinyl acetate | 1.0 | Yes | 65.6 | Good. |
| Methyl acrylate | 1.0 | Yes | 92.5 | Fair. |
| Ethyl acrylate | 1.0 | Yes | 56.2 | Fair. |
| N-vinyl-2-pyrrolidone | 0.5 | Yes | 30.4 | Fair. |
| Control [a] | | No | 0 | Poor. |

[a] Control run—commercial polyethylene having a melt index of 0.7 and a density of 0.96 pressed at 180° C. and 6000 p.s.i. into 20 mil film.
[b] Van de Graaff electron accelerator used as irradiation source.
[c] Obtained by dyeability test described supra.

67–70, Interscience Publishers, New York, 1954, and Block and Graft Copolymers, R. J. Ceresa, pp. 83–89, Butterworths Inc., Washington, D.C., 1962.

It should also be noted that the vinylidene monomers as disclosed herein can be employed together to form copolymers which are operable to crosslink the polyethylene in the additive of the instant invention.

What is claimed is:

1. A composition consisting of uncrosslinked polyethylene having a density in the range 0.91 to 0.97 g./cc. and a minor amount, between 0.1 to 20% by weight of said polyethylene of a thermoset additive consisting of polyethylene having a density of 0.91 to 0.97 crosslinked with polyvinyl acetate.

2. A composition according to claim 1 wherein said polyvinyl acetate is present in the additive in an amount equal to 1 to 95% by weight of the additive.

3. A process for producing a polyethylene composition which comprises blending uncrosslinked polyethylene having a density in the range 0.91 to 0.97 at a temperature above its melting point with a minor amount, between 0.1 to 20% by weight of said polyethylene of a thermoset additive consisting of polyethylene having a density of 0.91 to 0.97 crosslinked with and containing 1 to 95% by weight of polyvinyl acetate.

4. A process for producing a polyethylene composition consisting of irradiating polyethylene at a dosage in the range 0.01 to 2.0 megarads to form active sites on said polyethylene, contacting said irradiated polyethylene with vinyl acetate monomer for sufficient time to graft polymerize said vinyl acetate and crosslink said irradiated polyethylene between said active sites, thereby forming a thermoset additive containing 1 to 95% polyvinyl acetate, said irradiation and additive-forming steps being performed in an inert atmosphere, and thereafter blending said additive with uncrosslinked polyethylene having a density in the range 0.91 to 0.97 above the melting point of the polyethylene, said additive being present in said blend in an amount between 0.1 to 20% by weight of said blended polyethylene.

References Cited by the Examiner

UNITED STATES PATENTS

| 2,841,569 | 7/1958 | Rugg et al. | 260—878 |
| 3,065,157 | 11/1962 | Busse | 260—878 |
| 3,090,770 | 5/1963 | Gregorian | 260—878 |

FOREIGN PATENTS 823,462  11/1959  Great Britain.

MURRAY TILLMAN, *Primary Examiner.*

G. F. LESMES, *Assistant Examiner.*

Disclaimer 3,226,454.—*Nelson S. Marans*, and *Razmic S. Gregorian*, Silver Spring, Md. POLYETHYLENE COMPOSITION CONTAINING CROSS-LINKED POLYETHYLENE GRAFT COPOLYMER AND PROCESS THEREFOR. Patent dated Dec. 28, 1965. Disclaimer filed Sept. 17, 1965, by the assignee, *W. R. Grace & Co.*

Hereby enters this disclaimer to the terminal portion of said patent subsequent to May 21, 1980.

[*Official Gazette February 8, 1966.*]